United States Patent
Bae et al.

(10) Patent No.: US 11,455,707 B2
(45) Date of Patent: Sep. 27, 2022

(54) SUPER-RESOLUTION METHOD USING LOCAL BINARY PATTERN CLASSIFICATION AND LINEAR MAPPING

(71) Applicant: UNIVERSITY-INDUSTRY COOPERATION GROUP OF KYUNG HEE UNIVERSITY, Yongin-si (KR)

(72) Inventors: Sung-Ho Bae, Daejeon (KR); Sungyoung Lee, Seongnam-Si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 127 days.

(21) Appl. No.: 17/029,493

(22) Filed: Sep. 23, 2020

(65) Prior Publication Data

US 2021/0004934 A1    Jan. 7, 2021

Related U.S. Application Data

(63) Continuation of application No. PCT/KR2019/003764, filed on Apr. 1, 2019.

(30) Foreign Application Priority Data

Apr. 6, 2018 (KR) .................. 10-2018-0040419

(51) Int. Cl.
*G06T 3/40* (2006.01)
*G06F 17/16* (2006.01)
(Continued)

(52) U.S. Cl.
CPC ............ *G06T 3/4053* (2013.01); *G06F 17/16* (2013.01); *G06K 9/6268* (2013.01);
(Continued)

(58) Field of Classification Search
CPC ......... G06T 3/4053–4076; G06T 5/009; G06T 5/50; G06T 2207/10024; G06T 2207/20016; G06F 17/16; G06K 9/6268
See application file for complete search history.

(56) References Cited

U.S. PATENT DOCUMENTS

2015/0269708 A1* 9/2015 Porikli .................. G06T 3/4007
                                                      382/160
2020/0342572 A1* 10/2020 Chen ..................... G06N 3/0454

FOREIGN PATENT DOCUMENTS

JP      2008-299618 A    12/2008
JP      2017-500651 A     1/2017
(Continued)

OTHER PUBLICATIONS

Choi et al "Super Interpolating with edge orientation based mapping kernels for low complex 2x sampling" IEEE 2016 (Year: 2016).*
(Continued)

*Primary Examiner* — Sean T Motsinger
(74) *Attorney, Agent, or Firm* — Studebaker & Brackett PC (57) ABSTRACT

A super-resolution method according to the inventive concept may include receiving an input image of low resolution, separating the input image into low resolution (LR) unit patches, classifying a texture type of each of pixels included in the input image using a local binary pattern for the LR unit patches, generating high resolution (HR) unit patches corresponding to each of the pixels based on a mapping kernel corresponding to the texture type, and combining the HR unit patches based on a predetermined setting to generate an output image of high resolution.

15 Claims, 6 Drawing Sheets

(51) Int. Cl.
  *G06K 9/62* (2022.01)
  *G06T 5/00* (2006.01)
  *G06T 5/50* (2006.01)
(52) U.S. Cl.
  CPC ............ *G06T 3/4038* (2013.01); *G06T 5/009* (2013.01); *G06T 5/50* (2013.01); *G06T 2207/10024* (2013.01); *G06T 2207/20016* (2013.01)

(56) References Cited

FOREIGN PATENT DOCUMENTS

| KR | 10-2014-0040322 A | 4/2014 |
| KR | 10-2015-0107360 A | 9/2015 |
| WO | 2015-083396 A1 | 6/2015 |

OTHER PUBLICATIONS

Ojala et al "Multiresolution greyscale and rotation invariant texture classification with local binary patters" IEEE 2002 (Year: 2002).*
International Search Report issued in PCT/KR2019/003764; dated Jul. 10, 2019.

* cited by examiner

SUPER-RESOLUTION METHOD USING LOCAL BINARY PATTERN CLASSIFICATION AND LINEAR MAPPING

CROSS-REFERENCE TO RELATED APPLICATIONS

The present application is a continuation of International Patent Application No. PCT/KR2019/003764, filed on Apr. 1, 2019, which is based upon and claims the benefit of priority to Korean Patent Application No. 10-2018-0040419, filed Apr. 6, 2018. The disclosures of the above-listed applications are hereby incorporated by reference herein in their entirety.

BACKGROUND

Embodiments of the inventive concept described herein relate to a super-resolution method, and more specifically, to a super-resolution method for classifying a texture using a local binary pattern and using linear mapping through a mapping kernel corresponding to the classified texture, thereby increasing resolution.

Various types of electronic devices have been developed and distributed based on electronic technology. In particular, a display device such as a TV, which is one of the most widely used home appliances in general homes, has rapidly developed in recent years. As performance of the display device is advanced, a lot of research has been conducted to improve image quality of the display device.

In addition, as a 4K-UHD TV market is greatly expanded, demand for UHD content has also rapidly increased. However, the UHD content is still in a very short supply compared to Full-HD content. Meanwhile, a considerable cost is required to produce the UHD content. Therefore, there is a need for a technology to convert the existing Full-HD content into UHD quality. However, the conventional resolution enhancement techniques have a disadvantage that requires a lot of time to convert the resolution (size and sharpness of an image).

PRIOR TECHNICAL DOCUMENT

Patent Document (Patent Document 1) Korean Patent Publication No. 10-2015-0107360

SUMMARY

Embodiments of the inventive concept provide a super-resolution method for quickly converting a low resolution input image into a high resolution output image in real time.

According to an embodiment of the inventive concept, a super-resolution method may include receiving an input image of low resolution, separating the input image into low resolution (LR) unit patches, classifying a texture type of each of pixels included in the input image using a local binary pattern for the LR unit patches, generating high resolution (HR) unit patches corresponding to each of the pixels based on a mapping kernel corresponding to the texture type, and combining the HR unit patches based on a predetermined setting to generate an output image of high resolution.

As an embodiment, the receiving of the input image may include converting an original image into a YUV format and then selecting a Y-channel image.

As an embodiment, each of the LR unit patches may include one central pixel and peripheral pixels surrounding the central pixel.

As an embodiment, the classifying of the texture type may include calculating a difference between a pixel value of each of the peripheral pixels and a pixel value of the central pixel to generate the local binary pattern and converting the local binary pattern into a decimal number to determine a unit patch grade of the central pixel.

As an embodiment, the generating of the local binary pattern may include matching the associated peripheral pixel to 0 when the pixel value difference has a negative number, matching the associated peripheral pixel to 1 when the pixel value difference has a positive number, and arranging 0 or 1 corresponding based on a set order of the peripheral pixels to generate the local binary pattern.

As an embodiment, the mapping kernel may be determined based on the unit patch grade.

As an embodiment, the mapping kernel may be determined based on an equation below, and in the equation below, "$y^l$" may be a vectorized LR unit patch, "$y^h$" may be a vectorized HR unit patch, and "$\lambda$" may be a weight.

$$M_i = \arg\min_{M \in \mathcal{R}^{D \times D}} \sum_{j=1}^{K} \|y_j^h - M y_j^l\|_2^2 + \lambda \|M\|_F^2$$
$$= \arg\min_{M \in \mathcal{R}^{D \times D}} \|Y_i^h - M Y_i^l\|_2^2 + \lambda \|M\|_F^2,$$

As an embodiment, the mapping kernel may be determined based on an equation below, which is calculated by applying least square minimization to the equation, and in the equation below, "I" may be an identity matrix, and "$Y^T$" may be a transpose matrix of "Y".

$$M_i = Y_i^h Y_i^{l^T} (Y_i^l Y_i^{l^T} + \lambda I)^{-1}$$

As an embodiment, the generating of the HR unit patch may include converting each of the LR unit patches into an LR unit matrix according to a first rule, performing dot product calculation of the LR unit matrix and the mapping kernel to generate an HR unit matrix, and converting the HR unit matrix into each of the HR unit patches according to a second rule.

As an embodiment, the LR unit patches may include overlapping pixels with one another.

As an embodiment, a central pixel of a first LR unit patch may be different from a central pixel of a second LR unit patch.

As an embodiment, each of the HR unit patches may be disposed around a central pixel of each of the LR unit patches corresponding thereon.

As an embodiment, the HR unit patches may be arranged adjacent to one another at the same interval to constitute the output image.

As an embodiment, each of the LR unit patches may include 3×3 pixels and include one central pixel and eight peripheral pixels surrounding the central pixel.

As an embodiment, each of the HR unit patches may include 2×2 pixels.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

It should be understood that both the foregoing general description and the following detailed description are exemplary and it should be considered that an additional description of the claimed inventive concept is provided. Reference numerals are indicated in detail in the preferred embodiments of the inventive concept and examples of which are indicated in the drawings. Whenever possible, the same reference numerals are used in the description and drawings to refer to the same or similar parts.

Terms such as "first" or "second" may be used to describe various elements but the elements should not be limited to the above terms. The above terms are used only to distinguish one element from another. For example, a first element may be referred to as a second element without departing from the scope of rights of the inventive concept, and likewise a second element may be referred to as a first element.

It will be understood that when an element is referred to as being "connected" or "coupled" to another element, it may be directly connected or coupled to the other element or intervening elements may be present. In contrast, it will be understood that when an element is referred to as being "directly connected" or "directly coupled" to another element, there are no intervening elements present. Meanwhile, other expressions describing relationships between elements such as "~between", "immediately ~between", or "directly adjacent to ~" may be construed similarly.

The terminology used herein is for the purpose of describing particular embodiments only and is not intended to be limiting of the inventive concept. The singular forms "a", "an," and "the" are intended to include the plural forms as well, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or a combination thereof.

Unless otherwise defined, all terms used herein, including technical or scientific terms, have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted to have ideal or excessively formal meanings unless clearly defined herein.

Hereinafter, embodiments will be described in detail with reference to the accompanying drawings. However, the scope of the patent application is not limited or limited by these embodiments. The same reference numerals in each drawing indicate the same members.

Figure 1:
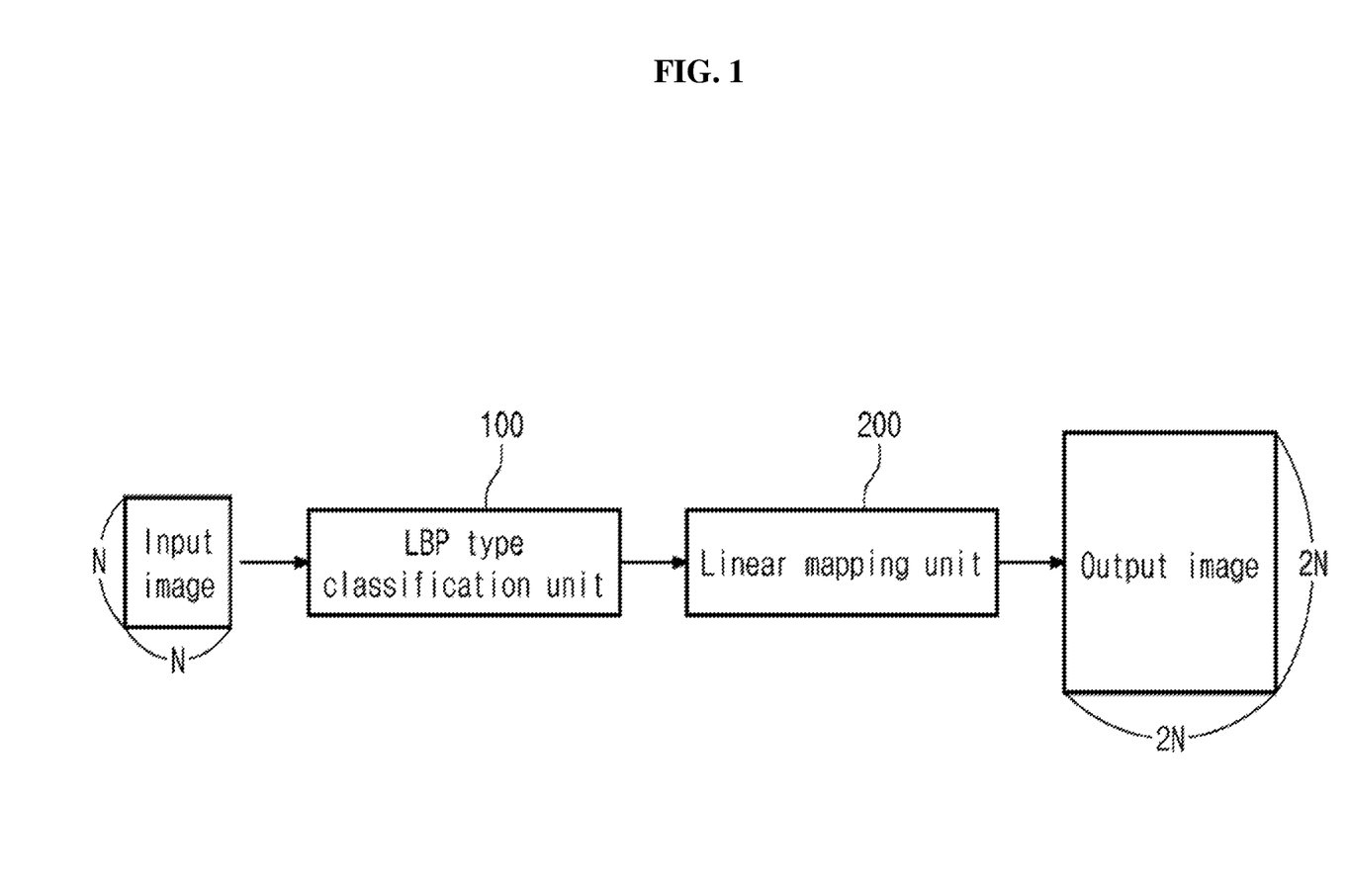
FIG. 1 is a schematic diagram illustrating a super-resolution method according to an embodiment of the inventive concept.

FIG. 1 is a schematic diagram illustrating a super-resolution method according to an embodiment of the inventive concept. Referring to FIG. 1, the super-resolution method of the inventive concept may be performed through a local binary pattern (LBP) type classification unit 100 and a linear mapping unit 200. The super-resolution method of the inventive concept may increase resolution of an input image (e.g., N×N resolution) to generate an output image (e.g., 2N×2N resolution). The input image may be referred to as a low resolution (LR) image, and the output image may be referred to as a high resolution (HR) image. For example, the super-resolution method of the inventive concept may convert a Full-HD image into a 4K UHD image or a 4K UHD image into an 8K UHD image.

In order to perform the super-resolution method of the inventive concept, an original image may be converted from an RGB format to a YUV format. A Y-channel (luminosity) image may be selected as the input image. A U-channel image and a V-channel image may be converted using a Bicubic interpolation method.

The input image may be input to the LBP type classification unit 100. The LBP type classification unit 100 may classify the input image into low resolution (LR) unit patches. Each LR unit patch is set as a group of 3×3 pixels included in the input image. Each of the pixels may be expressed as a pixel value (luminosity). However, the LR unit patch is not limited thereto, and the number of pixels included in the LR unit patch may be variously set.

The LBP type classification unit 100 may classify a texture type of each pixel included in the input image using a local binary pattern for the LR unit patches. For example, each of the LR unit patches may include one central pixel and eight peripheral pixels. The LBP type classification unit 100 may determine a texture type of the central pixel of each of the LR unit patches. The LBP type classification unit 100 may calculate a difference between a pixel value of each peripheral pixel and a pixel value of the central pixel. Depending on a calculation result, the pixel value difference may have a negative number (−) or a positive number (+). The LBP type classification unit 100 may match the associated peripheral pixel with 0 when the pixel value difference has the negative number. The LBP type classification unit 100 may match the associated peripheral pixel with 1 when the pixel value difference has the positive number. That is, the eight peripheral pixels may correspond to 0 or 1, and each of the LR unit patches may be represented in binary. The binarized LR unit patches may be converted into decimal number and may correspond to one of 256 grades. That is, the texture type of the central pixel of the LR unit patches may be classified based on the 256 grades. The method of classifying texture types of central pixels corresponding to the LR unit patches using a local binary pattern will be described in detail with reference to FIG. 5.

When the texture type is classified for the central pixel of the LR unit patches, the linear mapping unit 200 may apply a mapping kernel to each of the LR unit patches to generate high resolution (HR) unit patches. For example, the linear mapping unit 200 may arrange the LR unit patches in a specific order to generate a 1×9 LR unit matrix. The linear mapping unit 200 may multiply the LR unit matrix by the mapping kernel to calculate a 4×1 HR unit matrix. That is, the mapping kernel may have a size of 9×4. The size of the mapping kernel may be determined depending on a size of the LR unit matrix and a size of the HR unit matrix. The linear mapping unit 200 may convert the HR unit matrix into a 2×2 HR unit patch. The linear mapping unit 200 may combine the generated HR unit patches to generate an output image. An operation method of the linear mapping unit 200 will be described in detail with reference to FIG. 6.

Figure 2:
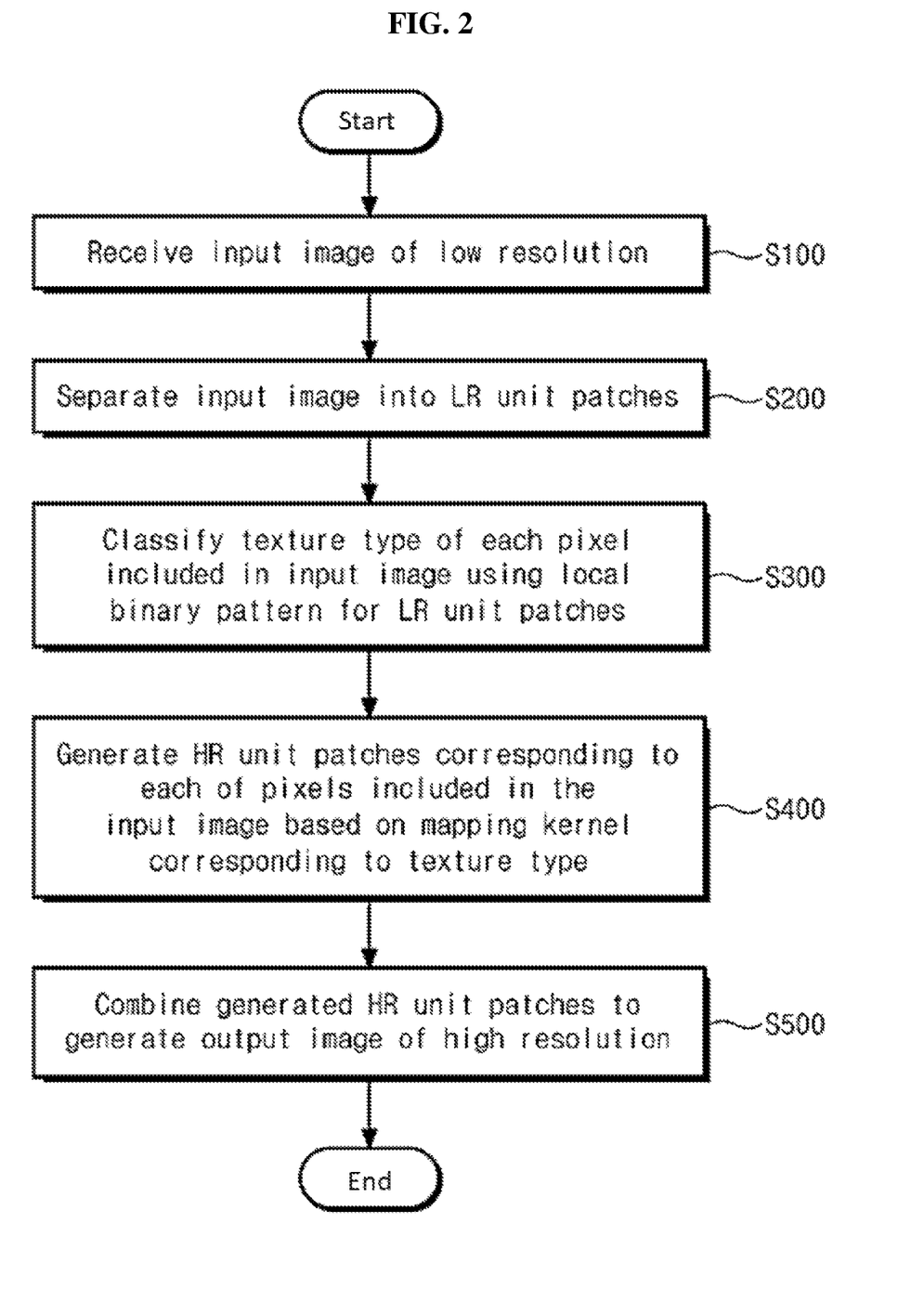
FIG. 2 is a flow chart illustrating a super-resolution method according to an embodiment of the inventive concept.
Figure 3:
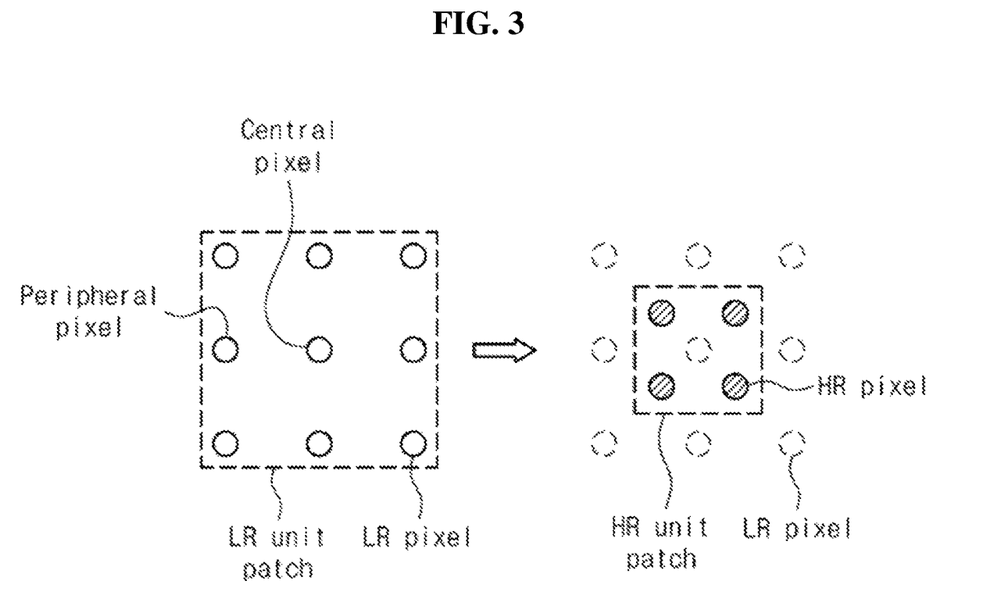
FIGS. 3 and 4 are diagrams illustrating a relationship between an LR unit patch and an HR unit patch.
Figure 4:
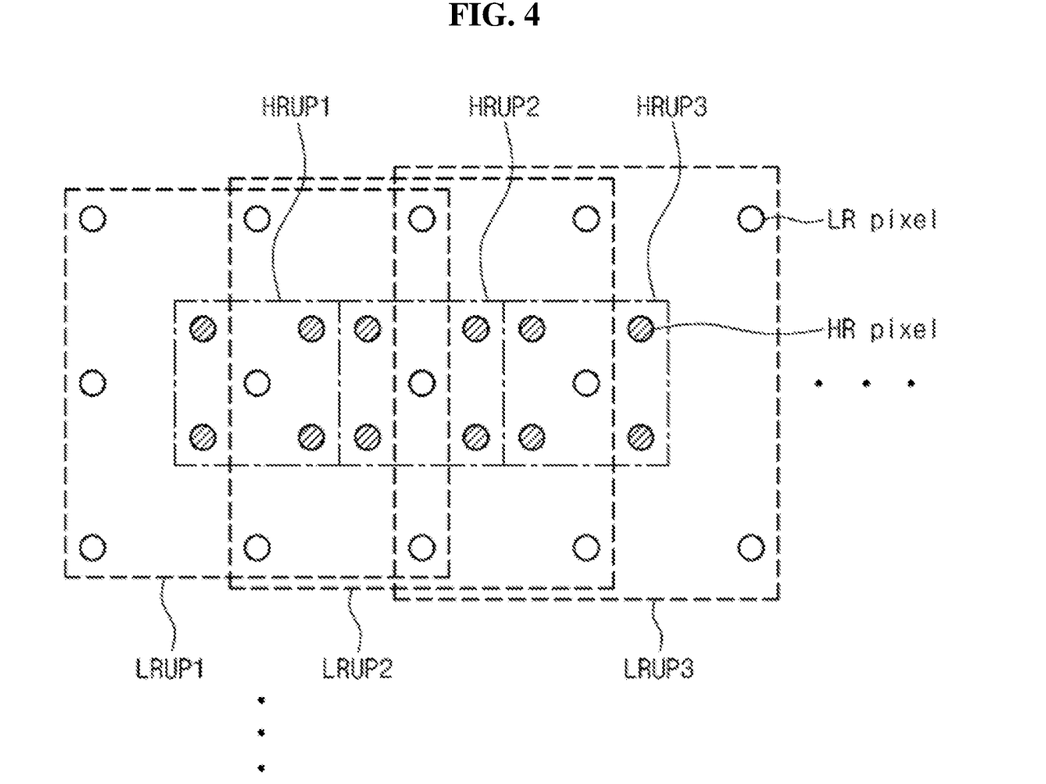
Figure 5:
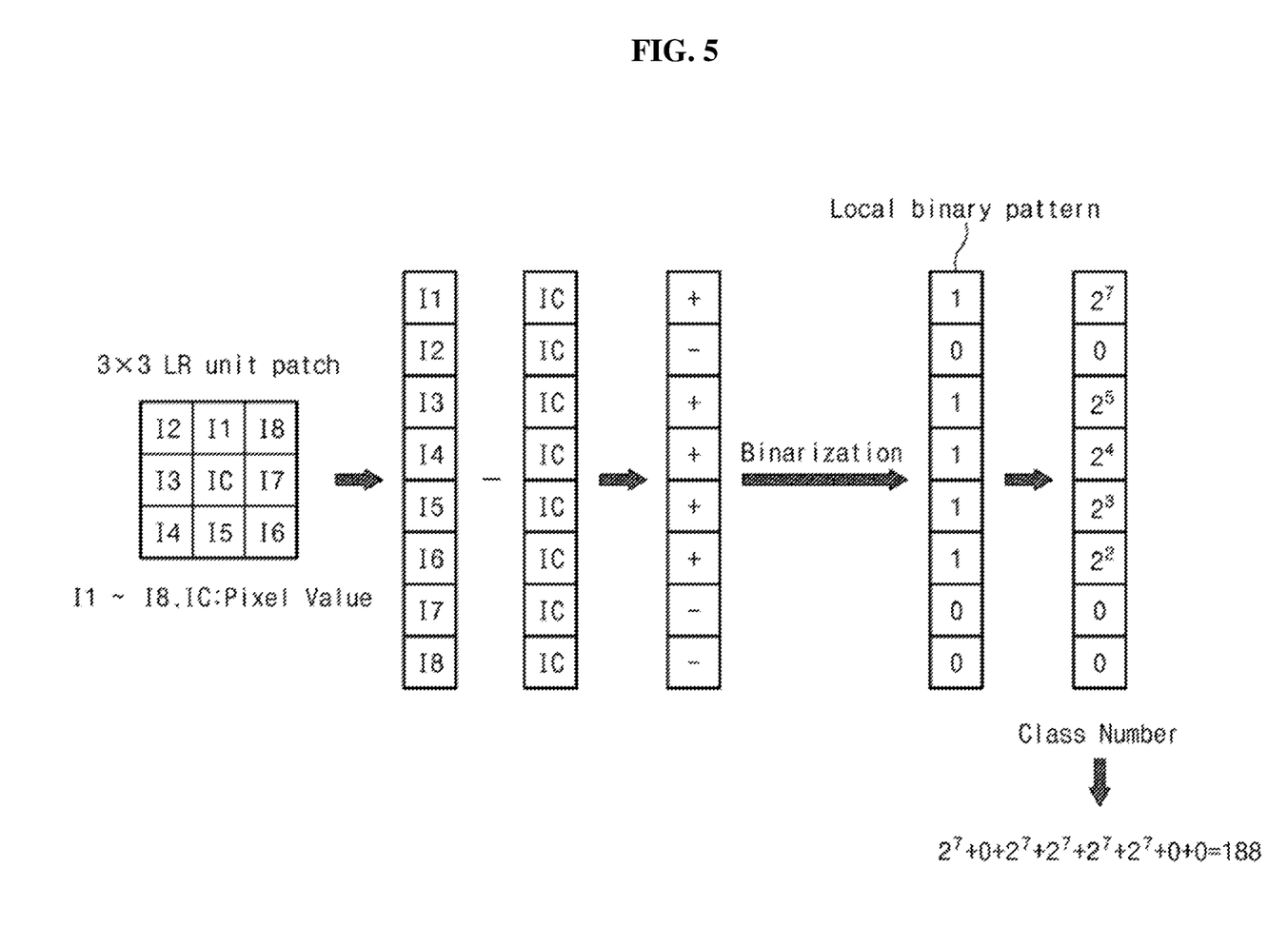
FIG. 5 is a diagram illustrating a method of determining a grade of a central pixel included in an LR unit patch.
Figure 6:
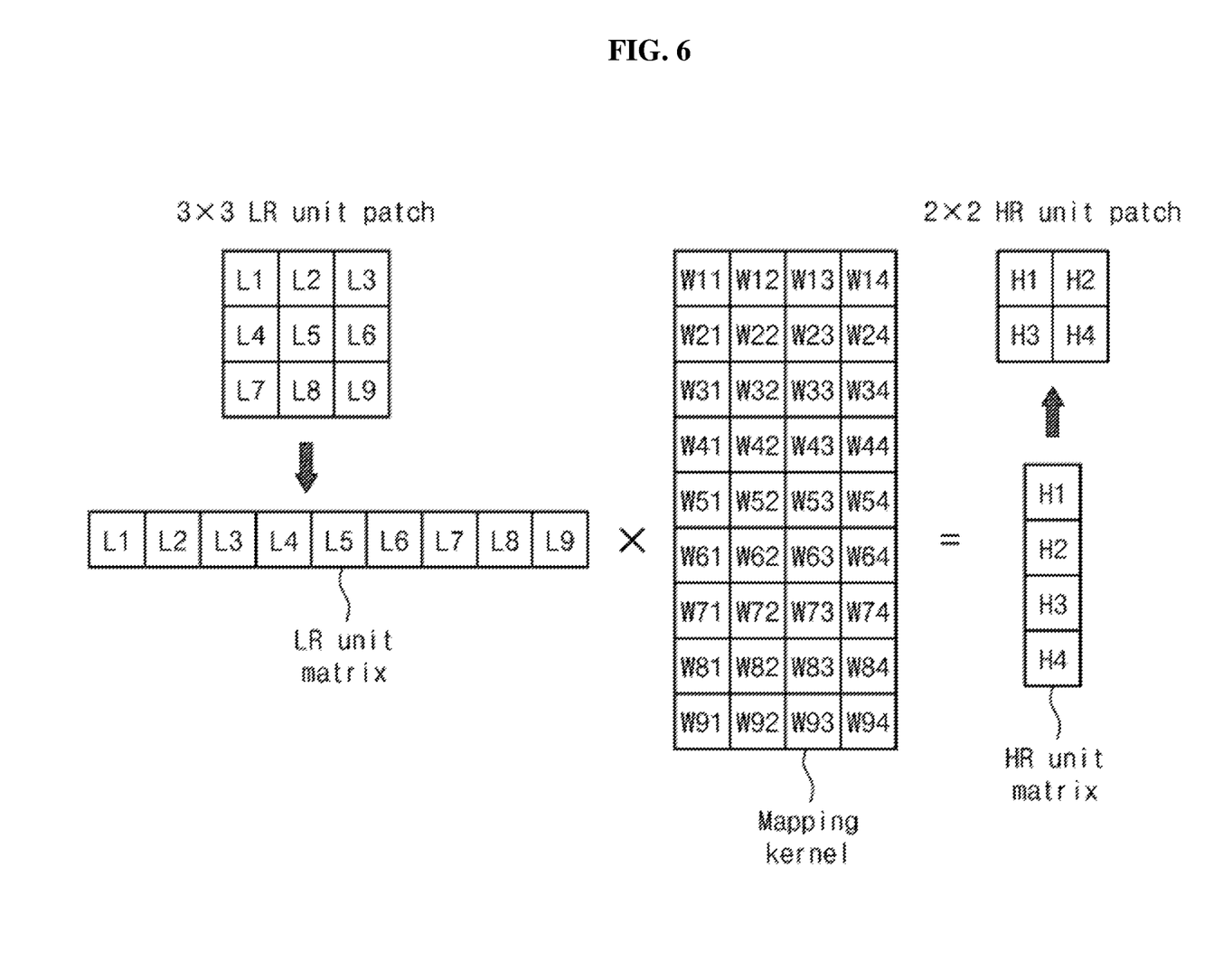
FIG. 6 is a diagram illustrating a method of determining an HR unit patch from an LR unit patch.

FIG. 2 is a flow chart illustrating a super-resolution method according to an embodiment of the inventive concept. FIGS. 3 and 4 are diagrams illustrating a relationship between an LR unit patch and an HR unit patch. FIG. 5 is a diagram illustrating a method of determining a grade of a central pixel included in an LR unit patch. FIG. 6 is a diagram illustrating a method of determining an HR unit patch from an LR unit patch.

Referring to FIG. 2, a super-resolution method of the inventive concept may include receiving an input image of low resolution in S100, separating the input image into LR unit patches in S200, classifying a texture type of each pixel included in the input image using a local binary pattern for the LR unit patches in S300, generating HR unit patches corresponding to each of the pixels included in the input image based on a mapping kernel corresponding to the texture type in S400, and combining the generated HR unit patches to generate an output image of high resolution in S500.

In S100, an original image may be converted from a RGB format to a YUV format. A Y-channel (luminosity) image may be selected as the input image. Accordingly, each pixel included in the input image may be expressed as a pixel value (luminosity).

In S200, referring to FIGS. 3 and 4, the input image may be separated into LR unit patches. For example, each of the LR unit patches may include 9 pixels as a 3×3 unit patch. Each of the LR unit patches may include one central pixel and eight peripheral pixels positioned around the central pixel. In the LR unit patches, the central pixel may be set as moving side by side. For example, in FIG. 4, the LR unit patches may be set as LR unit patches LRUP1, LRUP2, and LRUP3. That is, different LR unit patches may include overlapping pixels.

In S300, referring to FIG. 5, a unit patch grade of each of the LR unit patches may be determined based on pixel values of pixels included in each of the LR unit patches. For example, in FIG. 5, a pixel value of the central pixel may be expressed as IC and pixel values of peripheral pixels may be expressed as I1 to I8. A pixel value difference obtained by subtracting the pixel value IC of the central pixel from each of the pixel values I1 to I8 of each peripheral pixel may be expressed as a negative number (−) or a positive number (+). When the pixel value difference has the negative number, the associated peripheral pixel may be corresponded to 0. When the pixel value difference has the positive number, the associated peripheral pixel may correspond to 1. That is, the eight peripheral pixels I1 to I8 may correspond to 0 or 1, respectively and each of the LR unit patches may be binarized and expressed as a local binary pattern. The local binary pattern may be converted into decimal number. The decimal number is defined as the unit patch grade. Each of the LR unit patches may correspond to one of 256 unit patch grades. That is, each of the LR unit patches may have a texture type classified based on the unit patch grade.

In S400, referring to FIG. 6, the LR unit patches may be arranged according to a specific rule and converted into a low resolution (LR) unit matrix. For example, the LR unit patch may be converted into a 1×9 LR unit matrix. Dot product calculation of the LR unit matrix and the mapping kernel may be performed. The mapping kernel may have a size of 9×4. The size of the mapping kernel may be determined depending on a size of the LR unit patch and a size of the HR unit patch to be generated.

The mapping kernel may be determined based on the unit patch grade determined in S300. The mapping kernel may be specified based on the unit patch grade. For example, the mapping kernel may be determined by Equations 1 and 2 as follows.

$$M_i = \underset{M \in \mathcal{R}^{D \times D}}{\arg\min} \sum_{j=1}^{K} \|y_j^h - My_j^l\|_2^2 + \lambda\|M\|_F^2 \qquad \text{[Equation 1]}$$
$$= \underset{M \in \mathcal{R}^{D \times D}}{\arg\min} \|Y_i^h - MY_i^l\|_2^2 + \lambda\|M\|_F^2,$$

$$M_i = Y_i^h {Y_i^l}^T ({Y_i^l}{Y_i^l}^T + \lambda I)^{-1} \qquad \text{[Equation 2]}$$

When Equation 1 is calculated by applying least square minimization, Equation 1 may be expressed as Equation 2. By solving Equation 2, the mapping kernel corresponding to each unit patch grade may be obtained. In Equations 1 and 2, "$y^l$" means a vectorized LR unit patch. "$y^h$" means a vectorized HR unit patch. "λ" means weight and is a scalar value. "I" means for an identity matrix. "$Y^T$" means a transpose matrix of "Y". Meanwhile, the mapping kernel may be determined as an optimal matrix through learning.

The HR unit matrix may be calculated by the dot product of the LR unit matrix and the mapping kernel. For example, the HR unit matrix may have a size of 4×1. The HR unit matrix may be converted into a 2×2 HR unit patch according to a specific rule.

Each HR unit patch may be generated based on each LR unit patch. Referring to FIG. 4 again, a first HR unit patch HRUP1 may be generated based on a first LR unit patch LRUP1. A second HR unit patch HRUP2 may be generated based on a second LR unit patch LRUP2. A third HR unit patch HRUP3 may be generated based on a third LR unit patch LRUP3.

In S500, each of the generated HR unit patches may be arranged at a position corresponding to a central pixel of the associated LR unit patch. One central pixel may correspond to a 2×2 HR unit patch. For example, referring to FIG. 4, the first HR unit patch HRUP1 may be disposed around a central pixel of the first LR unit patch LRUP1. The second HR unit patch HRUP2 may be disposed around a central pixel of the second LR unit patch LRUP2. The third HR unit patch HRUP3 may be disposed around a central pixel of the third LR unit patch LRUP3. The HR unit patches HRUP1, HRUP2, and HRUP3 may be disposed adjacent to one another not to overlap. Accordingly, an input image of N×N may be converted into an output image of 2N×2N.

Table 1 below compares calculation times of a LBP-based texture classification technique of the inventive concept and the conventional gradient direction-based texture classification technique.

TABLE 1

|  | LBP-based classification technique | Gradient direction-based classification technique |
| --- | --- | --- |
| Super-resolution time | 0.016 seconds | 43.100 seconds |

Table 1 shows efficiency of the super-resolution method of the inventive concept. Results in Table 1 are results performed on the MATLAB2017b platform. In Addition, the super-resolution process in Table 1 was performed in a PC environment equipped with an Intel i7-7660U dual core and 16 GB RAM. In Table 1, time taken after 10,000 repetitions was measured using a 3×3 image patch. When the LBP-based texture classification technique of the inventive concept was used, the time took 0.016 seconds for the super-resolution, and when the gradient direction-based texture classification technique was used, the time took 43.100 seconds for the super-resolution. That is, the super-resolution method of the inventive concept may be performed at an improved speed of about 2,650 times compared to the conventional method.

The LBP type classification unit 100 and the linear mapping unit 200 of FIG. 1 may be implemented using hardware components, software components, or a combination thereof. For example, the device and elements described in embodiments may be configured using one or more general-purpose or special purpose computers, such as, for example, a processor, a controller and an arithmetic logic unit (ALG), a digital signal processor, a microcomputer, a field programmable array (FPGA), a programmable logic unit (PUL), a microprocessor, or any other device capable of responding to and executing instructions. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to embodiments may be implemented in the form of program instructions that capable of being executed through various computer means to be recorded in computer-readable media. The computer-readable media may include, alone or in combination with program instructions, data files, data structures, and the like. The program instructions recorded on the media may be specially designed and configured for the embodiment, or may be known to and usable by those skilled in computer software arts. Examples of the computer-readable media include magnetic media such as hard disks, floppy disks, and magnetic tape, optical media such as CD ROM disks and DVD, magneto-optical media such as floptical disks, and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments or vice versa.

According to an embodiment of the inventive concept, the low resolution input image may quickly generate the high resolution output image in real time.

According to an embodiment of the inventive concept, the input image of the low resolution is separated into the low resolution unit patches, and the low resolution unit patches may be simply classified by grade using the local binary pattern.

According to an embodiment of the inventive concept, the low resolution unit patches which are classified by grade may be quickly converted into the high resolution unit patches using the corresponding mapping kernel.

As described above, the embodiments have been disclosed in the drawings and specifications. Although specific terms have been used herein, these are only used for the purpose of describing the inventive concept, and are not used to limit the meaning or the scope of the inventive concept described in the claims. Therefore, those of ordinary skill in the art will understand that various modifications and equivalent other embodiments are possible therefrom. Accordingly, the genuine technical protection scope of the inventive concept should be determined by the technical spirit of the appended claims.

What is claimed is:

1. A super-resolution method comprising:
receiving an input image of low resolution;
separating the input image into low resolution (LR) unit patches, each of which is set as a group of 3×3 pixels included in the input image;
classifying a texture type of each of pixels included in the input image using a local binary pattern for the LR unit patches;
arranging the LR unit patches in a specific order to generate a LR unit matrix having a size of 1×9:
multiplying the LR unit matrix by a mapping kernel corresponding to the texture type, to calculate a high resolution (HR) unit matrix having a size of 4×1, wherein a size of the mapping kernel has a size of 9×4, which is determined depending on a size of the LR unit matrix and a size of the HR unit matrix;
converting the HR unit matrix into HR unit patches, each of which is set as a group of 2×2 pixels; and
combining the HR unit patches based on a predetermined setting to generate an output image of high resolution.

2. The super-resolution method of claim 1, wherein the receiving of the input image includes converting an original image into a YUV format and then selecting a Y-channel image.

3. The super-resolution method of claim 1, wherein each of the LR unit patches includes one central pixel and peripheral pixels surrounding the central pixel.

4. The super-resolution method of claim 3, wherein the classifying of the texture type includes:
calculating a difference between a pixel value of each of the peripheral pixels and a pixel value of the central pixel to generate the local binary pattern; and
converting the local binary pattern into a decimal number to determine a unit patch grade of the central pixel.

5. The super-resolution method of claim 4, wherein the generating of the local binary pattern includes:
matching the associated peripheral pixel to 0 when the pixel value difference has a negative number;

matching the associated peripheral pixel to 1 when the pixel value difference has a positive number; and arranging 0 or 1 corresponding based on a set order of the peripheral pixels to generate the local binary pattern.

6. The super-resolution method of claim 4, wherein the mapping kernel is determined based on the unit patch grade.

7. The super-resolution method of claim 1, wherein the mapping kernel is determined based on an equation below, and in the equation below, "$y^l$" is a vectorized LR unit patch, "$y^h$" is a vectorized HR unit patch, and "$\lambda$" is a weight, $$M_i = \underset{M \in \mathcal{R}^{D \times D}}{\arg\min} \sum_{j=1}^{K} \|y_j^h - My_j^l\|_2^2 + \lambda\|M\|_F^2$$
$$= \underset{M \in \mathcal{R}^{D \times D}}{\arg\min} \|Y_i^h - MY_i^l\|_2^2 + \lambda\|M\|_F^2.$$

8. The super-resolution method of claim 7, wherein the mapping kernel is determined based on an equation below, which is calculated by applying least square minimization to the equation, and in the equation below, "I" is an identity matrix, and "$Y^T$" is a transpose matrix of "Y", $$M_i = Y_i^h Y_i^{l^T}(Y_i^l Y_i^{l^T} + \lambda I)^{-1}.$$

9. The super-resolution method of claim 1, wherein the generating of the HR unit patch includes:

converting each of the LR unit patches into an LR unit matrix according to a first rule;

performing dot product calculation of the LR unit matrix and the mapping kernel to generate an HR unit matrix; and converting the HR unit matrix into each of the HR unit patches according to a second rule.

10. The super-resolution method of claim 1, wherein the LR unit patches include overlapping pixels with one another.

11. The super-resolution method of claim 1, wherein a central pixel of a first LR unit patch is different from a central pixel of a second LR unit patch.

12. The super-resolution method of claim 1, wherein each of the HR unit patches is disposed around a central pixel of each of the LR unit patches corresponding thereon.

13. The super-resolution method of claim 1, wherein the HR unit patches are arranged adjacent to one another at the same interval to constitute the output image.

14. The super-resolution method of claim 1, wherein each of the LR unit patches includes 3×3 pixels and includes one central pixel and eight peripheral pixels surrounding the central pixel.

15. The super-resolution method of claim 1, wherein each of the HR unit patches includes 2×2 pixels.

* * * * *